(12) United States Patent  (10) Patent No.: US 7,541,011 B2
Hu                          (45) Date of Patent:      Jun. 2, 2009

(54) PHASE TRANSITIONAL ABSORPTION METHOD

(76) Inventor: Liang Hu, 297 Creek Ave., Hampton, VA (US) 23669

( * ) Notice: Subject to any disclaimer, the term of this patent is extended or adjusted under 35 U.S.C. 154(b) by 357 days.

(21) Appl. No.: 11/279,095

(22) Filed: Apr. 7, 2006

(65) Prior Publication Data

US 2007/0237695 A1    Oct. 11, 2007

(51) Int. Cl.
*B01D 53/48* (2006.01)
*B01D 53/50* (2006.01)
*B01D 53/52* (2006.01)
*B01D 53/62* (2006.01)
*B01D 53/68* (2006.01)

(52) U.S. Cl. .................. 423/220; 423/226; 423/228; 423/234; 423/242.1; 423/242.2; 423/242.7; 423/243.01; 423/243.08; 423/243.11; 423/243.12; 423/240 R; 423/243.06

(58) Field of Classification Search .......... 423/220, 423/226, 228, 234, 242.1, 242.2, 242.7, 243.01, 423/243.06, 243.08, 243.11, 243.12, 240 R
See application file for complete search history.

(56) References Cited

U.S. PATENT DOCUMENTS 6,969,418 B1 * 11/2005 Hu .................. 95/235
2007/0286783 A1 * 12/2007 Carrette et al. ........... 423/228

OTHER PUBLICATIONS

Howard Herzog et al.; Co2 Capture, Reuse and Storage Technologies for Mitigating Global Climate Change; DOE Order No. DE-AF22-96PC01257; Jan. 1997; 70 pages; Cambridge, MA, US.

James T. Yeh et al.; Semi-batch Absorption and Regeneration Studies for Co2 Capture by Aqueous Ammonia; Fuel Processing Technology 86 (2005); pp. 1533-1546; Pittsburgh, PA, US.

Kevin P. Resnik et al.; Aqua Ammonia Process for Simultaneous Removal of Co2, So2, and NOx; International Journal of Environmental Technology and management vol. 4, Nos. 1/2, 2004; 19 pages; US.

Dr. R.H. Niswander et al.; A More Energy Efficient Product for Carbon Dioxide Separation; Separation Science and Technology, 28(1-3); 1993; pp. 565-578; Freeport, TX, US.

* cited by examiner

*Primary Examiner*—Timothy C Vanoy
(74) *Attorney, Agent, or Firm*—Panitch Schwarze Belisario & Nadel LLP

(57) ABSTRACT

The present invention is directed to an improved method and system for separating and purifying gas using gas-liquid absorption. According to this invention, the method is carried out in an absorber, where a liquid absorbent, a gas mixture containing a gas to be absorbed were introduced from an inlet. During absorption, the second liquid phase was separated out from the absorbent. The absorbed gas was accumulated in one of liquid phases. After absorption, two liquid phases were separated. One of the liquids with rich absorbed gas was forward to regenerator. After regeneration, the liquid was cycled back to absorber. The liquid phase with lean absorbed gas was back to absorber directly to complete the cycle.

16 Claims, 1 Drawing Sheet

PHASE TRANSITIONAL ABSORPTION METHOD

BACKGROUND OF INVENTION

1. Field of the Invention

This invention relates to the method for gas separation. In particular, this invention relates to gas separation by phase transitional absorption.

2. Background

Current technologies for gas absorption are still limited to using one liquid phase as absorbent. The gas in gas mixture is absorbed into absorbent. The absorbent with absorbed gas is regenerated in regeneration column. After regeneration, the absorbent is recycled back to absorber to complete the cycle.

SUMMARY OF INVENTION

The present invention is directed to an improved method and system for separating and purifying gas using gas-liquid absorption.

According to this invention, the method is carried out in an absorber, where a liquid absorbent, a gas mixture containing a gas to be absorbed were introduced from an inlet. During absorption, the absorbed gas was accumulated in one of liquid phases. After absorption, two liquid phases were separated. One of the liquids with rich absorbed gas was forward to regenerator. After regeneration, the liquid was cycled back to absorber. The liquid phase with lean absorbed gas was recycled back to absorber directly to complete the cycle.

In one aspect, the method of the present invention could be used to remove an impurity gas from a gas mixture of interest or to collect a gas of interest from a gas mixture at improved efficiency. In another aspect, the method of the present invention provides significant saving on regeneration energy because solvent phase (gas lean phase) was separated before regeneration, only part of the absorbent (gas rich phase) was forward to regeneration. Yet in another aspect, absorption rate could be increased significantly by selecting proper solvent.

It is apparent that two or three or more compounds may compose the liquid absorbent.

It is be understood that both the foregoing general description and the following detailed description are exemplary and are intended to provide further explanation of the invention as claimed.

BRIEF DESCRIPTION OF DRAWINGS

Without restricting the full scope of this invention, the preferred form of this invention is illustrated in the following drawings.

DETAILED DESCRIPTION

Figure 1:
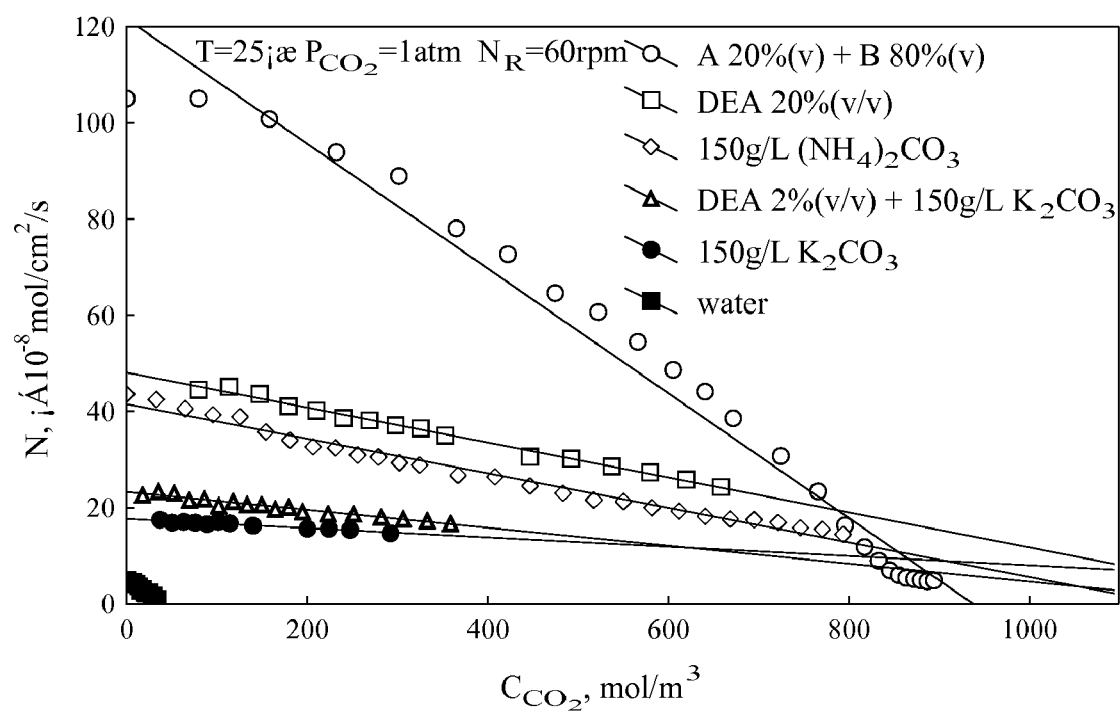
FIG. 1 Comparison of Absorption Rate

The following description is demonstrative in nature and is not intended to limit the scope of the invention or its application of uses. There are a number of significant design features and improvements incorporated within the invention.

The objective of the current invention for a low-cost viable process to capture and purify a gas based on phase-transitional absorption process.

The difference between traditional absorption with phase transitional absorption was the absorbent. In phase transitional absorption, the liquid absorbent was composed of two or three or more compounds. In the components of absorbent, some of the components called activated agent that reacted with absorbed gas to form a new compound. Some of the components called solvent that play the role of improving the physical and chemical properties of the absorbent. During absorption, the activated agent reacted with absorbed gas to form new compounds. The new compounds were not soluble in solvent and separated out from absorbent to form new liquid phase with rich absorbed gas.

According to the current invention, the method is carried out in an absorber, where a liquid absorbent, a gas mixture containing a gas to be absorbed were introduced from an inlet. During absorption, the absorbed gas was accumulated in one of liquid phases. After absorption, two liquid phases were separated. One of the liquids with rich absorbed gas was forward to regenerator. After regeneration, the liquid was cycled back to absorber. The liquid phase with lean absorbed gas was recycled back to absorber directly to complete the cycle.

In one aspect, the method of the present invention could be used to remove an impurity gas from a gas mixture of interest or to collect a gas of interest from a gas mixture at improved efficiency. In another aspect, the method of the present invention provides significant saving on regeneration energy because solvent phase (gas lean phase) was separated before regeneration, only part of the absorbent (gas rich phase) was forward to regeneration. Yet in another aspect, absorption rate could be increased significantly by selecting proper solvent.

An example for explanation is as follows.

Compound A was an activated agent in liquid. Compound B was a solvent. Compound A dissolved in solvent B. A and B formed solution for $CO_2$ absorption. During absorption, compound A reacted with $CO_2$ to form $A.CO_2$. $A.CO_2$ was not soluble in solvent B. $A.CO_2$ formed new phase. After separation of phase $A.CO_2$ with solvent B, solvent B was cycled back. $A.CO_2$ was forward to regeneration. After regeneration, the compound A was cycled back and mixed again with solvent B for $CO_2$ absorption.

Absorption Rate

In the inventor's study, the carbon dioxide absorption rates were measured. The absorbents included water, aqueous solution of ammonium carbonate (150 g/l), aqueous solution of potassium carbonate (150 g/l), aqueous solution of diethanolamine (20% by volume), diethanolamine activated potassium carbonated solution($K_2CO_3$ 150 g/l+DEA 2% by volume) and the absorbent of phase transitional absorption. The absorbent used in phase transitional absorption was composed of 80% solvent B and 20% activated agent A. All experiments were conducted at the same experimental conditions. The carbon dioxide gas was supplied by cylinder with over 99.99% purity. The $CO_2$ absorber was a 3-liter glass container with a cooling and heating coil. 900 ml liquid (absorbent) was filled into absorber. Absorption was operated at 25° C., 1 atm. The liquid was agitated at the speed of 60 rpm. The gas was also agitated at the same speed. The absorption rate of carbon dioxide at time t was determined by the difference of two flow rates, in and out of absorber with two foam film flow meters. The experimental results showed in FIG. 1.

As seen in FIG. 1, the absorption rate by using the technology of phase transitional absorption had amazing results. The absorption rate by phase transitional absorption (80% solvent B and 20% activated agent A) was 3 times faster than DEA (20% by volume) aqueous solution, 3 times faster than ammonium carbonate solution (150 g/L), 7 times faster than $K_2CO_3$ (150 g/l), 6 times faster than DEA (2% by volume) activated $K_2CO_3$ (150 g/l).

CO₂ Loading Capacity $CO_2$ loading capacity or specific absorption capacity of the solutions for each cycle is related to the energy cost of regeneration. The measured specific absorption capacity in $CO_2$ rich phase is 0.144-0.2 g $CO_2$/g solution. This result was far from optimized. This compares favorably to current MEA (monoethanolamine) technology that has demonstrated capacity of 0.036 g $CO_2$/g solution for standard 20% MEA solution. The $CO_2$ loading capacity by phase transitional absorption is 4-6 times higher than that by standard 20% MEA solution.

Regeneration

After absorption, two liquid phases appeared. One was the phase of solvent B, another was the phase of $A.CO_2$. The samples were taken from both phases to determine the composition. The analysis was conducted by gas chromatograph. The analytical results showed that 0% of component A in the phase of solvent B, and more than 97% of component A in the phase of $A.CO_2$.

In the current invention, the absorbent was consisted of 80% solvent B and 20% activated agent A. After absorption, $A.CO_2$ phase was separated. Only 20% of the absorbent ($A.CO_2$) was forward to regeneration. This is a savings in regeneration energy.

The inventor's study showed that $A.CO_2$ started decomposition at about 80° C. However, the decomposition amount of $A.CO_2$ is the function of temperature. The total percentage of the carbon dioxide in solution was evolved up to the temperature. Another method to regenerate $A.CO_2$ is using steam to strip $CO_2$. This method is similar with the regeneration of $CO_2$ from MEA solution.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

That which is claimed is:

1. A method for separating a gas from a gas mixture, the method comprising:
   introducing a liquid absorbent into an absorber; said liquid absorbent comprising at least one activated agent and at least one solvent, wherein the at least one activated agent reacts or combines with an absorbed gas, and the at least one solvent does not react with the absorbed gas;
   introducing the gas mixture into the absorber, allowing the liquid absorbent to absorb the gas and to convert the gas into the absorbed gas;
   allowing the absorbed gas to react or combine with the at least one activated agent in the liquid absorbent to form at least one new compound, wherein said at least one new compound is separated out from the liquid absorbent and forms a gas rich phase;
   separating the gas rich phase from the rest of the liquid absorbent;
   cycling the at least one solvent in the rest of the liquid absorbent back to the absorber;
   regenerating the gas rich phase to obtain the gas and the at least one activated agent;
   cycling the at least one activated agent obtained from the regenerating step back the absorber.

2. The method of claim 1, wherein the gas mixture contains 0.001 to 99.999% of gas by weight.

3. The method of claim 1, wherein the ratio of the at least one activated agent and the at least one solvent in the liquid absorbent is from about 1:10000 to about 10000:1 by volume.

4. The method of claim 3, wherein the activated agent is made of one or more members selected from the group consisting of alkaline salts, ammonium, ammonia, alkanolamines, amines, amides and combinations thereof; and wherein the solvent is made of one or more members selected from the group consisting of water, alkanes, unsaturated hydrocarbons, alcohols, ethers, aldehydes, ketones, esters, carbohydrates and combinations thereof.

5. The method of claim 1, wherein the gas in the gas mixture is selected from the group consisting of $CO_2$, $SO_2$, $H_2S$, COS, fluorides, HCl, and combinations thereof.

6. The method of claim 1 further comprising maintaining the temperature of the absorber within the range from about 1° C. to about 300° C.; and maintaining the pressure of the absorber within the range from about 0.0001 to about 10000 atm.

7. The method of claim 1, further comprising collecting the gas regenerated from the gas rich phase.

8. The method of claim 1, wherein the at least one activated agent and the at least one solvent form a solution.

9. The method of claim 1, wherein the liquid absorbent and the gas mixture are introduced into the absorber through an identical inlet or two different inlets.

10. The method of claim 1, wherein the step of regenerating the gas rich phase comprises regenerating the gas rich phase in a regeneration colunm.

11. The method of claim 1, wherein the step of cycling the at least one solvent back to the absorber comprises cycling the rest of the liquid absorbent back to the absorber.

12. The method of claim 1, wherein the gas is an impurity to be removed from the gas mixture.

13. The method of claim 1, wherein the solvent enhances absorption rate of the gas into the liquid absorbent.

14. The method of claim 1, wherein the gas is absorbed at 25° C., 1 atm.

15. The method of claim 14, further comprising collecting the gas from the regeneration column.

16. A method for separating a gas from a gas mixture, comprising:
   introducing a liquid absorbent into an absorber through a first inlet, the liquid absorbent comprising at least one activated agent and at least one solvent, wherein the at least one activated agent reacts or combines with an absorbed gas and the at least one solvent does not react with the absorbed gas, but increases absorption rate of the gas into the liquid absorbent;
   introducing the gas mixture into the absorber through a second inlet, allowing the liquid absorbent to absorb the gas and to convert the gas into the absorbed gas, wherein the second inlet is the same as or different from the first inlet;

allowing the absorbed gas to react or combine with the at least one activated agent in the liquid absorbent to form at least one new compound, wherein the at least one new compound is separated out from the liquid absorbent and forms a gas rich phase;

separating the gas rich phase from the rest of the liquid absorbent;

cycling the rest of the liquid absorbent back to the absorber;

regenerating the gas rich phase in a regeneration column to obtain the gas and the at least one activated agent; and cycling the at least one activated agent from the regeneration column back to the absorber.

* * * * *